(12) United States Patent
Slivka

(10) Patent No.: US 10,352,097 B2
(45) Date of Patent: Jul. 16, 2019

(54) TOUCH HEM BAR CONTROL

(71) Applicant: Crestron Electronics, Inc., Rockleigh, NJ (US)

(72) Inventor: Benjamin Slivka, Hillsdale, NJ (US)

(73) Assignee: Crestron Electronics, Inc., Rockleigh, NJ (US)

( * ) Notice: Subject to any disclaimer, the term of this patent is extended or adjusted under 35 U.S.C. 154(b) by 339 days.

(21) Appl. No.: 15/429,295

(22) Filed: Feb. 10, 2017

(65) Prior Publication Data

US 2017/0167193 A1  Jun. 15, 2017

Related U.S. Application Data

(63) Continuation of application No. 14/880,784, filed on Oct. 12, 2015, now Pat. No. 9,644,424.

(51) Int. Cl.
| | |
|---|---|
| *E06B 9/72* | (2006.01) |
| *G08C 17/02* | (2006.01) |
| *H02K 7/14* | (2006.01) |
| *H02P 31/00* | (2006.01) |
| *E06B 9/42* | (2006.01) |
| *E06B 9/90* | (2006.01) |
| *E06B 9/68* | (2006.01) |
| *E06B 9/88* | (2006.01) |

(52) U.S. Cl.
CPC ............ *E06B 9/72* (2013.01); *E06B 9/42* (2013.01); *E06B 9/90* (2013.01); *G08C 17/02* (2013.01); *H02K 7/14* (2013.01); *H02P 31/00* (2013.01); *E06B 2009/6818* (2013.01); *E06B 2009/6827* (2013.01); *E06B 2009/6836* (2013.01); *E06B 2009/885* (2013.01)

(58) Field of Classification Search
CPC ..... E06B 9/72; E06B 9/90; E06B 9/42; E06B 2009/885; E06B 2009/6836; E06B 2009/6818; E06B 2009/6827; H02K 31/00; H02K 7/14; G08C 17/02
See application file for complete search history.

(56) References Cited

U.S. PATENT DOCUMENTS

| | | | | |
|---|---|---|---|---|
| 4,143,367 A | * | 3/1979 | Schestag | ................ B66B 13/26 160/133 |
| 4,262,176 A | * | 4/1981 | Kapitza | .................... E06B 9/88 160/133 |

(Continued)

*Primary Examiner* — Katherine W Mitchell
*Assistant Examiner* — Abe Massad
(74) *Attorney, Agent, or Firm* — Crestron Electronics, Inc.

(57) ABSTRACT

A motorized shade for covering a window, a door, or a wall opening is provided that can be actuated by touching its hem bar. The motorized shade, such as a roller shade, comprises a shade material extending from a top end to a bottom end, a hem bar assembly connected to the bottom end of the shade material, and a shade drive unit operably connected to the top end of the shade material. The hem bar assembly comprises a touch sensing module adapted to detect a user touching the hem bar assembly and transmit a control signal in response to the detected touch. The shade drive unit comprises a motor and a motor control module adapted to receive the control signal and control the motor to open or close the shade material. The control signal can be wirelessly transmitted from the touch sensing module to the motor control module.

23 Claims, 7 Drawing Sheets

(56) References Cited

U.S. PATENT DOCUMENTS

| | | | | |
|---|---|---|---|---|
| 4,273,974 A * | 6/1981 | Miller | H01H 3/142 | 200/61.43 |
| 4,731,548 A * | 3/1988 | Ingraham | H03K 17/962 | 307/116 |
| 4,758,735 A * | 7/1988 | Ingraham | H03K 17/962 | 307/116 |
| 4,764,708 A * | 8/1988 | Roudeski | F21V 23/04 | 200/600 |
| 4,807,686 A * | 2/1989 | Schnebly | E06B 9/262 | 160/7 |
| 5,027,552 A * | 7/1991 | Miller | H01H 3/142 | 49/27 |
| 5,079,417 A * | 1/1992 | Strand | F16P 3/12 | 250/221 |
| 5,198,974 A * | 3/1993 | Orsat | E06B 9/70 | 160/133 |
| 5,384,982 A * | 1/1995 | Galperin | F16P 3/12 | 200/61.43 |
| 5,832,665 A * | 11/1998 | Miller | E05F 15/44 | 49/27 |
| 5,848,634 A * | 12/1998 | Will | E06B 9/174 | 160/310 |
| 5,962,825 A * | 10/1999 | Miller | H01H 3/142 | 200/61.43 |
| 5,964,058 A * | 10/1999 | Richardson | E05F 15/44 | 49/27 |
| 6,286,257 B1 * | 9/2001 | Gregoriou | E05F 15/44 | 49/27 |
| 6,427,382 B2 * | 8/2002 | Gregoriou | E05F 15/44 | 49/27 |
| 6,571,512 B1 * | 6/2003 | Miller | E05F 15/44 | 49/27 |
| 6,723,933 B2 * | 4/2004 | Haag | E05F 15/46 | 200/600 |
| 7,034,682 B2 * | 4/2006 | Beggs | E06B 9/581 | 160/1 |
| 7,389,806 B2 * | 6/2008 | Kates | E06B 9/32 | 160/5 |
| 7,723,939 B2 * | 5/2010 | Carmen, Jr. | H02K 11/022 | 318/16 |
| 8,368,328 B2 * | 2/2013 | Mullet | E06B 9/42 | 318/255 |
| 8,944,138 B2 * | 2/2015 | Feldstein | E06B 9/72 | 160/310 |
| 8,947,027 B2 * | 2/2015 | Mullet | H02P 3/08 | 318/255 |
| 9,529,345 B2 * | 12/2016 | Cregg | G05B 15/02 | |
| 2016/0017656 A1 * | 1/2016 | Adreon | E06B 9/322 | 160/7 |

* cited by examiner

| Shade_state | Operating_command |
|---|---|
| Fully_lowered | Raise |
| During_raise | Stop |
| Partially_drawn_≤T_after_raise_stop | Lower |
| Fully_raised | Lower |
| During_lower | Stop |
| Partially_drawn_≤T_after_lower_stop | Raise |
| Partially_drawn_>T | Raise |

FIG. 7

| Gesture | Shade_state | Operating_command |
|---|---|---|
| Single_touch | Stationary_NOT_fully_lowered | Lower |
| Double_touch | Stationary_NOT_fully_raised | Raise |
| Single_touch | Moving | Stop |
| Double_touch | Moving | Stop |
| Hold | Stationary_NOT_fully_lowered | Slow_lower |
| Release_hold | Moving | Stop |
| Tap_hold | Stationary_NOT_fully_raised | Slow_raise |
| Release_tap_hold | Moving | Stop |
| Hold | Moving | Stop |
| Tap_hold | Moving | Stop |

FIG. 8

TOUCH HEM BAR CONTROL

BACKGROUND OF THE INVENTION

Technical Field

Aspects of the embodiments relate to motorized shades, and more particularly to systems, methods, and modes for a motorized shade, such as a motorized roller shade, that can be actuated by touching its hem bar.

Background Art

Motorized roller shades provide a convenient one-touch control solution for screening windows, doors, or the like, to achieve privacy and thermal effects. A motorized roller shade typically includes a rectangular shade material attached at one end to a cylindrical rotating tube, called a roller tube, and at an opposite end to a hem bar. The shade material is wrapped around the roller tube. An electric motor, either mounted inside the roller tube or externally coupled to the roller tube, rotates the roller tube to unravel the shade material to cover a window.

Motorized roller shades can be controlled in a variety of means. They can be controlled via in-wall switches or keypads or remotely via handheld remotes. Often, however, users prefer a local control of a motorized shade, without requiring connection to a control system or additional control products. Some motorized roller shades allow local control via buttons on the shade controller coupled to the roller shade motor in proximity to the roller tube. However, these buttons may be difficult or impossible to reach and they are non-intuitive.

Another solution exists that utilizes sensors which sense a pull or a tug on the shade or a hem bar to actuate the roller shade to control it locally. However, this solution requires quite a bit of force to pull on the shade or the hem bar and it is slow to react. Additionally, continued pulling on a shade for control can misalign the shade, damage the shade, or loosen tension in a counterbalancing system of the shade, in particularly when the shade is mounted poorly.

Accordingly, a need has arisen for a local control of a motorized shade, and more specifically, for a touch actuated motorized shade, such as a motorized roller shade.

SUMMARY OF THE INVENTION

It is an object of the embodiments to substantially solve at least the problems and/or disadvantages discussed above, and to provide at least one or more of the advantages described below.

It is therefore a general aspect of the embodiments to provide systems, methods, and modes for a local control of a motorized shade that will obviate or minimize problems of the type previously described.

It is also an aspect of the embodiments to provide systems, methods, and modes for a touch actuated motorized shade, and more particularly for a motorized shade, such as a motorized roller shade, that can be actuated by touching the hem bar.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Further features and advantages of the aspects of the embodiments, as well as the structure and operation of the various embodiments, are described in detail below with reference to the accompanying drawings. It is noted that the aspects of the embodiments are not limited to the specific embodiments described herein. Such embodiments are presented herein for illustrative purposes only. Additional embodiments will be apparent to persons skilled in the relevant art(s) based on the teachings contained herein.

DISCLOSURE OF INVENTION

According to one aspect of the embodiments, a motorized shade is provided for covering a window, a door, or a wall opening. The motorized shade comprises a shade material, a hem bar, and a shade drive unit. The shade material extends from a top end to a bottom end. The hem bar assembly is connected to the bottom end of the shade material and comprises a touch sensing module adapted to detect a touch of the hem bar assembly and transmit a control signal in response to the detected touch. The shade drive unit is operably connected to the top end of the shade material and comprises a motor and a motor control module adapted to receive the control signal and control the motor to open or close the shade material. The motorized shade can comprise a roller shade having a roller tube, the shade material wrapping about the roller tube, and the shade drive unit rotating the roller tube to raise and lower the shade material.

According to some aspects of the embodiments, the hem bar assembly can comprise a longitudinal bar electrically coupled to the touch sensing module via a contact, such that the touch sensing module detects a touch of the longitudinal bar. The longitudinal bar can comprise an electrically conductive material. The contact can comprises at least one selected from the group consisting of a spring, a wire, a ring, a screw, clips, spring clips, a clamp, teeth, projections, biasing members, spacers and any combinations thereof. The touch sensing module can be attached to an end of the longitudinal bar. The longitudinal bar can comprise an opening that receives the touch sensing module therein and the shade material, in turn, can comprise a pocket that receives the longitudinal bar therein. In another embodiment, the shade material can comprise a pocket that receives the longitudinal bar and the touch sensing module therein. In one embodiment, the longitudinal bar can be covered by the shade material. In another embodiment, the longitudinal bar can be covered by an outer layer. According to some aspects of the embodiments, the touch sensing module energizes the longitudinal bar thereby turning the surface of the longitudinal bar into a capacitive touch sensor. In one embodiment, the touch sensing module comprise an RC oscillator, the longitudinal bar is electrically connected to the RC oscillator, and the touch sensing module detects a touch of the longitudinal bar when the frequency of the RC oscillator is decreased below a predetermined threshold value. The change in frequency can be detected via a controller or a frequency comparator.

According to some aspects of the embodiments, each of the motor control module and the touch sensing module comprises a wireless interface for wirelessly transmitting the control signal. The wireless interface can comprise a radio frequency transceiver, an infrared transceiver, or the like. In one embodiment, the motor control module can be paired with the touch sensing module. In another embodiment, the control signal comprises a unique identification number that identifies the touch sensing module.

According to some aspects of the embodiments, the touch sensing module is adapted to detect: (i) a first gesture designated to direct the motor control module to open the shade material, and (ii) a second gesture designated to direct the motor control module to close the shade material. The first gesture can comprise a single touch and the second gesture can comprise a double touch, or vice-versa. In some embodiments, the touch sensing module can transmit a plurality of control signals to a plurality of motor control modules for substantial simultaneous control of a plurality of shades. The touch sensing module can detect a third gesture, the plurality of control signals identify the detected third gesture, and the third gesture is designated to direct a plurality of motor control modules to substantially simultaneously open or close a plurality of shade materials. The third gesture can comprise a triple touch.

According to some aspects of the embodiments, the motor control module stops opening or closing the shade material when the motor control module receives a control signal from the touch sensing module while the shade material is in the process of being opened or closed. In some aspects, the touch sensing module can detect a hold and release gesture designated to direct the motor control module to open or close the shade material in response to the detected hold of the hem bar assembly, and to stop opening or closing the shade material in response to the detected release of the hem bar assembly. Additionally, the touch sensing module can detect a tap-hold and release gesture designated to direct the motor control module to open or close the shade material in response to the detected tap and hold of the hem bar assembly, and to stop opening or closing the shade material in response of the detected release of the hem bar assembly. In some embodiments, the motor control module is further adapted to (i) detect that the hem bar assembly has hit or about to hit an obstacle when the motor control module receives a touch signal during a closing of the shade material, and (ii) stop closing the shade material. In one embodiment, subsequently to stopping closing the shade material, the motor control module opens the shade material by a predetermined amount. In another embodiment, the motor control module is adapted to (i) detect that the hem bar assembly has hit or about to hit an obstacle when the motor control module receives a hold signal during a closing of the shade material, (ii) stop closing the shade material, (iii) open the shade material, and (iv) stop opening the shade material upon receiving a release signal from the touch sensing module.

According to some aspects of the embodiments, the motor control module comprises a controller and a memory including a plurality of objects defining a plurality of operating commands based on a state of the motorized shade, wherein upon receipt of the control signal, the controller determines the state of the motorized shade and queries the memory to determine a respective operating command. The plurality of objects can define the following operating commands: (i) when the controller receives the control signal while the shade material is in a fully opened position, the controller controls the motor to close the shade material; (ii) when the controller receives the control touch signal while shade material is in a fully closed position, the controller controls the motor to open the shade material; and (iii) when the controller receives the control signal while the shade material is in the process of being opened or closed, the controller controls the motor to stop opening or closing the shade material. The plurality of objects can further define the following operating commands: (i) when the controller receives a subsequent control signal within a predetermined period of time after the shade material has stopped opening and the shade material is partially opened, the controller controls the motor to close the shade material; and (ii) when the controller receives a subsequent control signal within a predetermined period of time after the shade material has stopped closing and the shade material is partially closed, the controller controls the motor to open the shade material.

According to another aspect of the embodiments, a motorized shade is provided for covering a window, a door, or a wall opening with a touch sensing module that can be used as a safety mechanism. Such motorized shade can comprise: (a) a shade material extending from a top end to a bottom end; (b) a hem bar assembly connected to the bottom end of the shade material and comprising a touch sensing module adapted to detect a touch of the hem bar assembly and transmit a control signal in response to the detected touch; and (c) a shade drive unit operably connected to the top end of the shade material and comprising a motor and a motor control module adapted to (i) detect that the hem bar assembly has hit or about to hit an obstacle upon receiving the control signal during a closing of the shade material, and (ii) control the motor to stop closing the shade material. In one embodiment, the motor control module is further adapted to (i) detect that the hem bar assembly has hit or about to hit an obstacle when the motor control module receives a hold signal during a closing of the shade material, (ii) stop closing the shade material, (iii) open the shade material, and (iv) stop opening the shade material upon receiving a release signal from the touch sensing module.

According to another aspect of the embodiments, a roller shade is provided for covering a window, a door, or a wall opening comprising: (i) a roller tube; (ii) a shade material comprising a bottom end and a top end connected to the roller tube; (iii) a hem bar assembly connected to the bottom end of the shade material and comprising a longitudinal bar and a touch sensing module adapted to detect a touch of the longitudinal bar and wirelessly transmit a control signal in response to the detected touch; and (iv) a shade drive unit operably connected to the roller tube and comprising a motor and a motor control module adapt to wirelessly receive the control signal and control the motor to rotate the roller tube to raise or lower the shade material.

According to another aspect of the embodiments, a method is provided of controlling a motorized shade including (i) a shade material, (ii) a shade drive unit connected to a top end of the shade material and having a motor and a motor control module, and (iii) a hem bar assembly connected to a bottom end of the shade material and having a touch sensing module. The method can comprise: (a) detecting, by the touch sensing module, a touch of the hem bar assembly; (b) transmitting, by the touch sensing module, a control signal in response to the detected touch; (c) receiving, by the motor control module, the control signal; and (d) controlling, by the motor control module, the motor to open or close the shade material. The method can further comprise: (i) detecting, by the touch sensing module, a first gesture; (ii) controlling, by the motor control module, the motor to open the shade material in response to receiving a control signal comprising the first gesture; (iii) detecting, by the touch sensing module, a second gesture; and (iv) controlling, by the motor control module, the motor to close the shade material in response to receiving a control signal comprising the second gesture. In some embodiments, the first gesture can comprise a single touch and the second gesture comprises a double touch, or vice-versa.

According to some aspects of the embodiments, the method further comprises: (i) detecting, by the touch sensing module, a third gesture; (ii) transmitting, by the touch sensing module, a plurality of control signals to a plurality of motor control modules; and (iii) substantially simultaneously controlling, by the plurality of motor control modules, a plurality of shades in response to receiving the plurality of control signals comprising the third gesture. The third gesture can comprise a triple touch.

In another embodiment, the method can comprise: (i) detecting, by the touch sensing module, a hold of the hem bar assembly; (ii) controlling, by the motor control module, the motor to open or close the shade material in response to the detected hold; (iii) detecting, by the touch sensing module, a release of the hold of the hem bar assembly; and (iv) controlling, by the motor control module, the motor to stop opening or closing the shade material in response to the detected release.

According to some aspects of the embodiments, the method can comprise: (i) detecting, by the motor control module, that the hem bar assembly has hit or about to hit an obstacle when the motor control module receives a control signal during a closing of the shade material; and (ii) controlling, by the motor control module, the motor to stop closing the shade material. In one embodiment, the method comprises: subsequently, controlling, by the motor control module, to open the shade material by a predetermined amount. In another embodiment, the method further comprises: (i) detecting, by the motor control module, that the hem bar assembly has hit or about to hit an obstacle when the motor control module receives a hold signal during a closing of the shade material; and (ii) controlling, by the motor control module, to stop closing the shade material, to open the shade material, and to stop opening the shade material upon receiving a release signal from the touch sensing module.

BRIEF DESCRIPTION OF THE DRAWINGS

The above and other objects and features of the embodiments will become apparent and more readily appreciated from the following description of the embodiments with reference to the following figures. Different aspects of the embodiments are illustrated in reference figures of the drawings. It is intended that the embodiments and figures disclosed herein are to be considered to be illustrative rather than limiting. The components in the drawings are not necessarily drawn to scale, emphasis instead being placed upon clearly illustrating the principles of the aspects of the embodiments. In the drawings, like reference numerals designate corresponding parts throughout the several views.

BRIEF DESCRIPTION OF THE SEVERAL VIEWS OF THE DRAWING

Figure 1A:
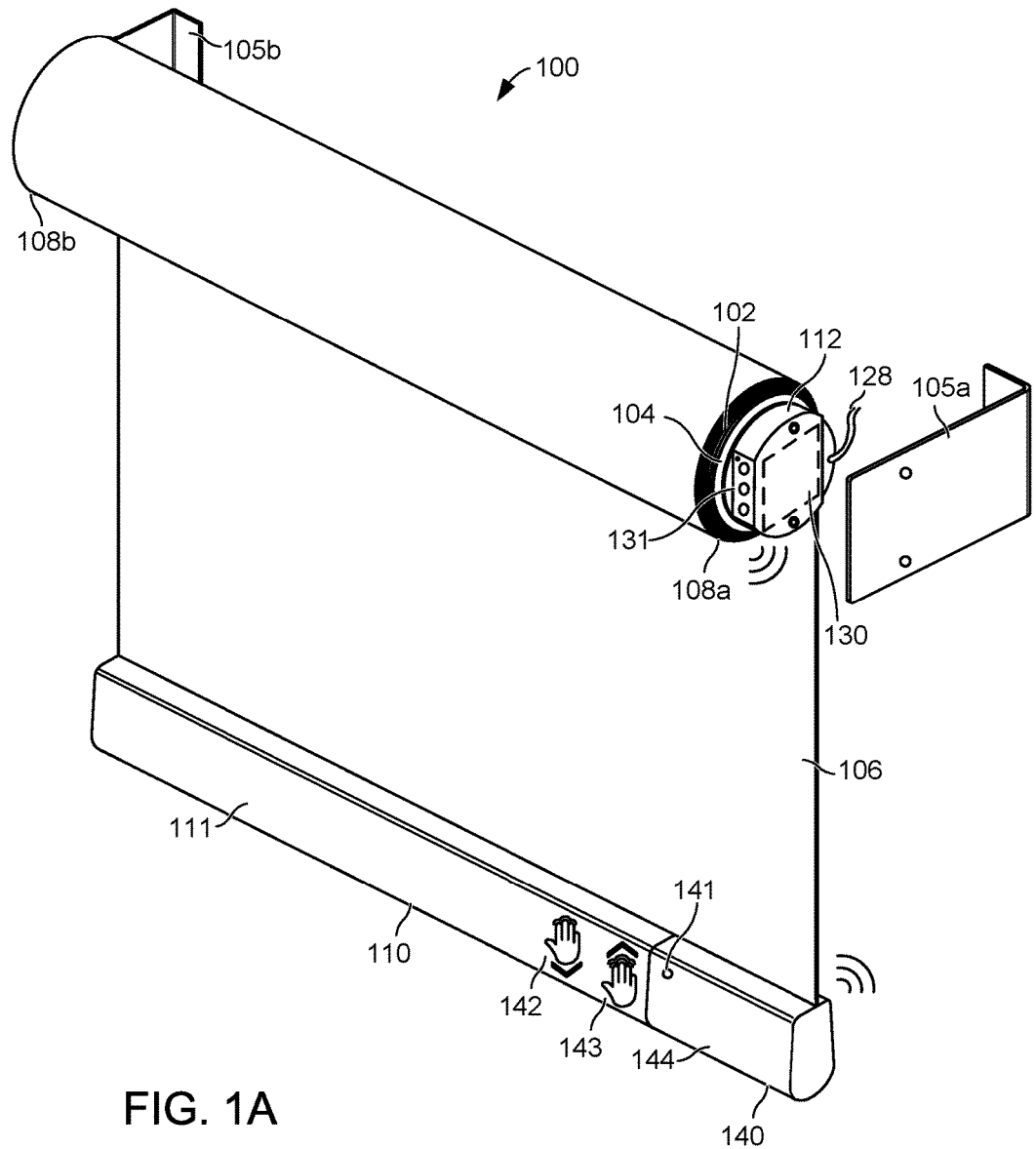
Figure 1B:
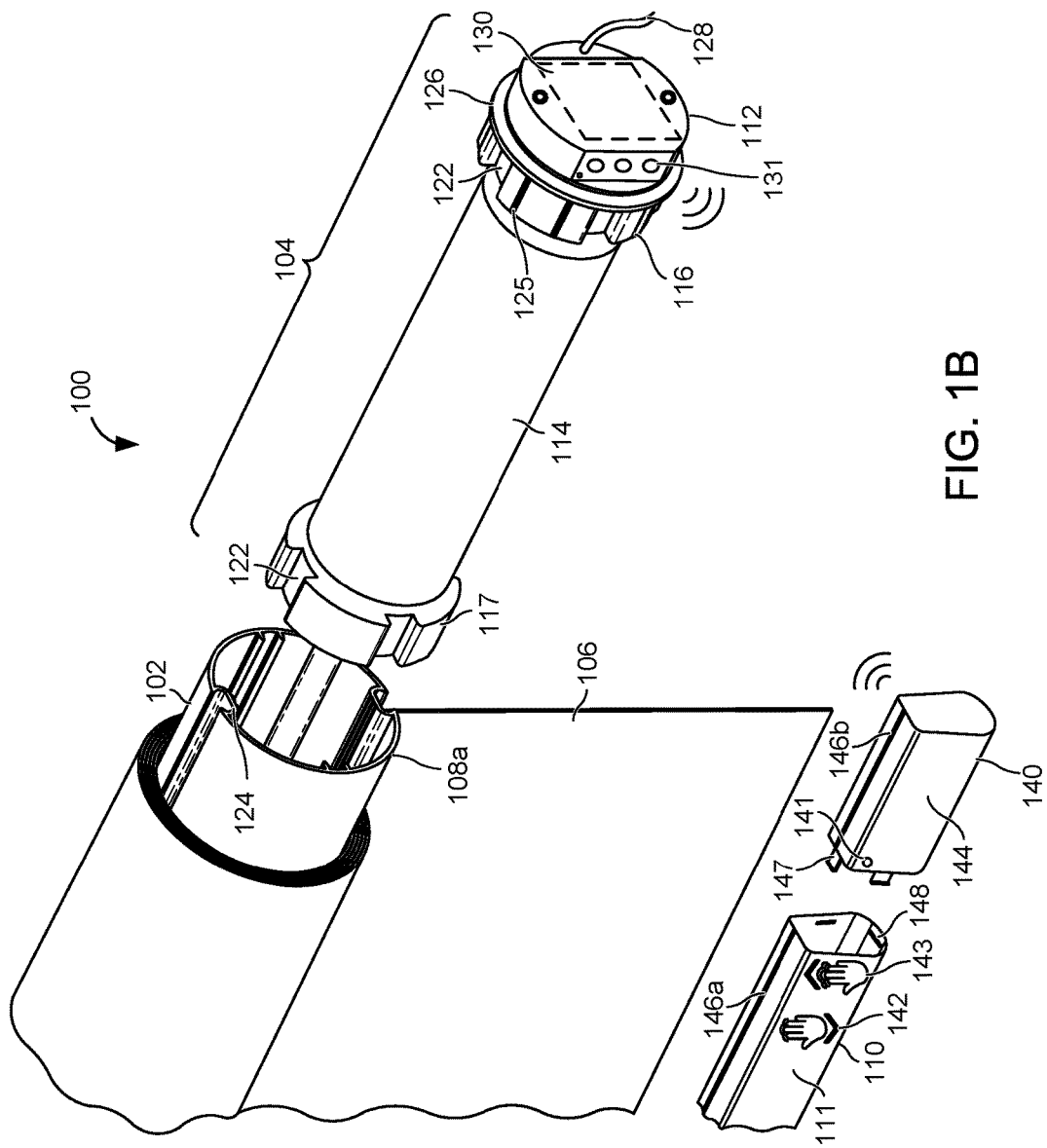
Figure 2:
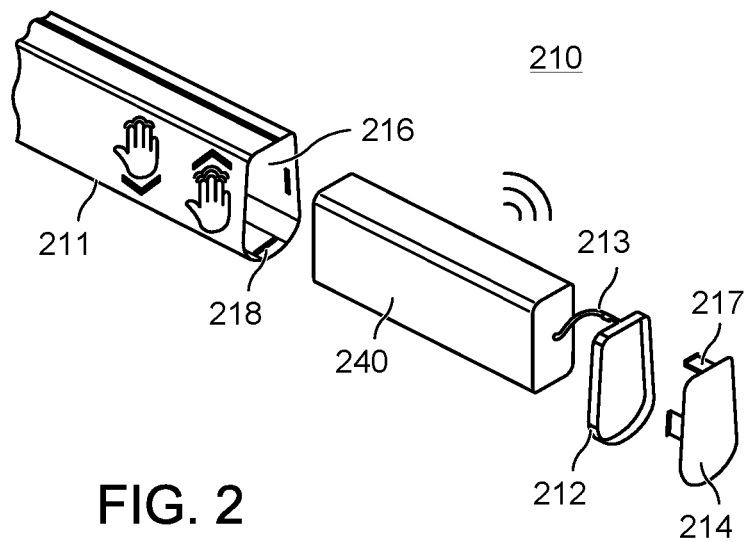
Figure 3:
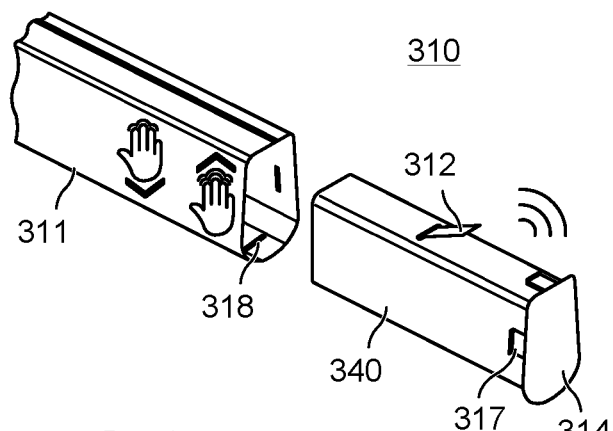
Figure 4:
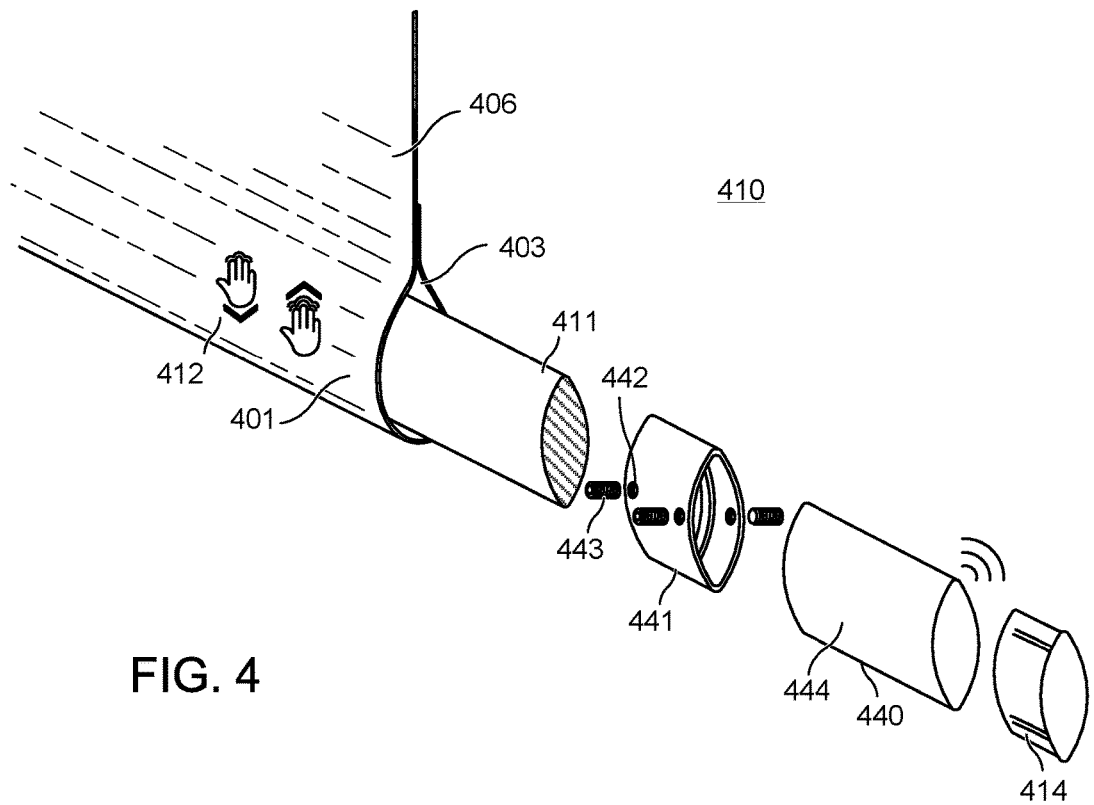
Figure 5:
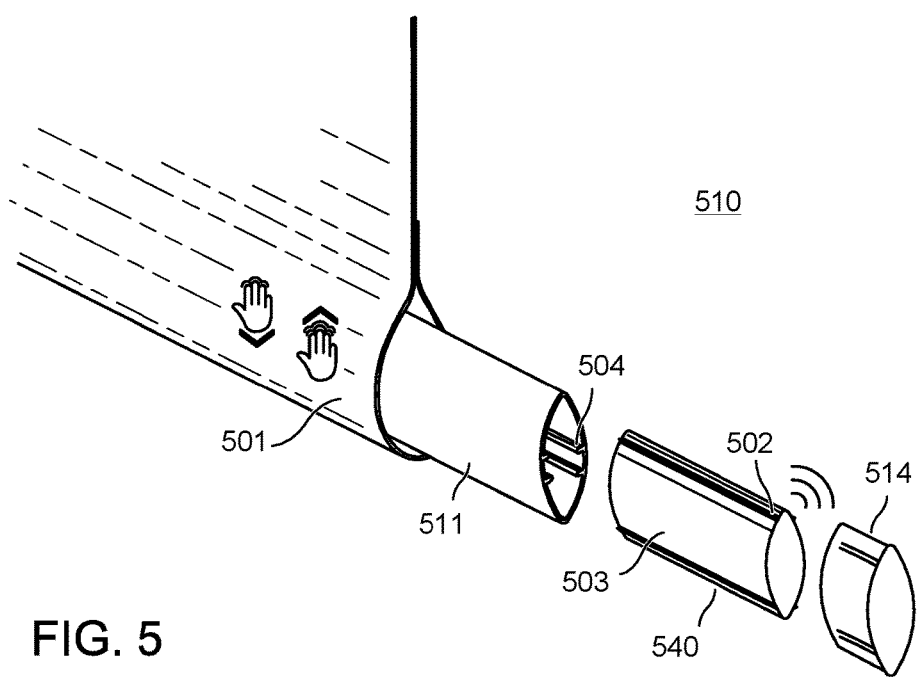
Figure 6:
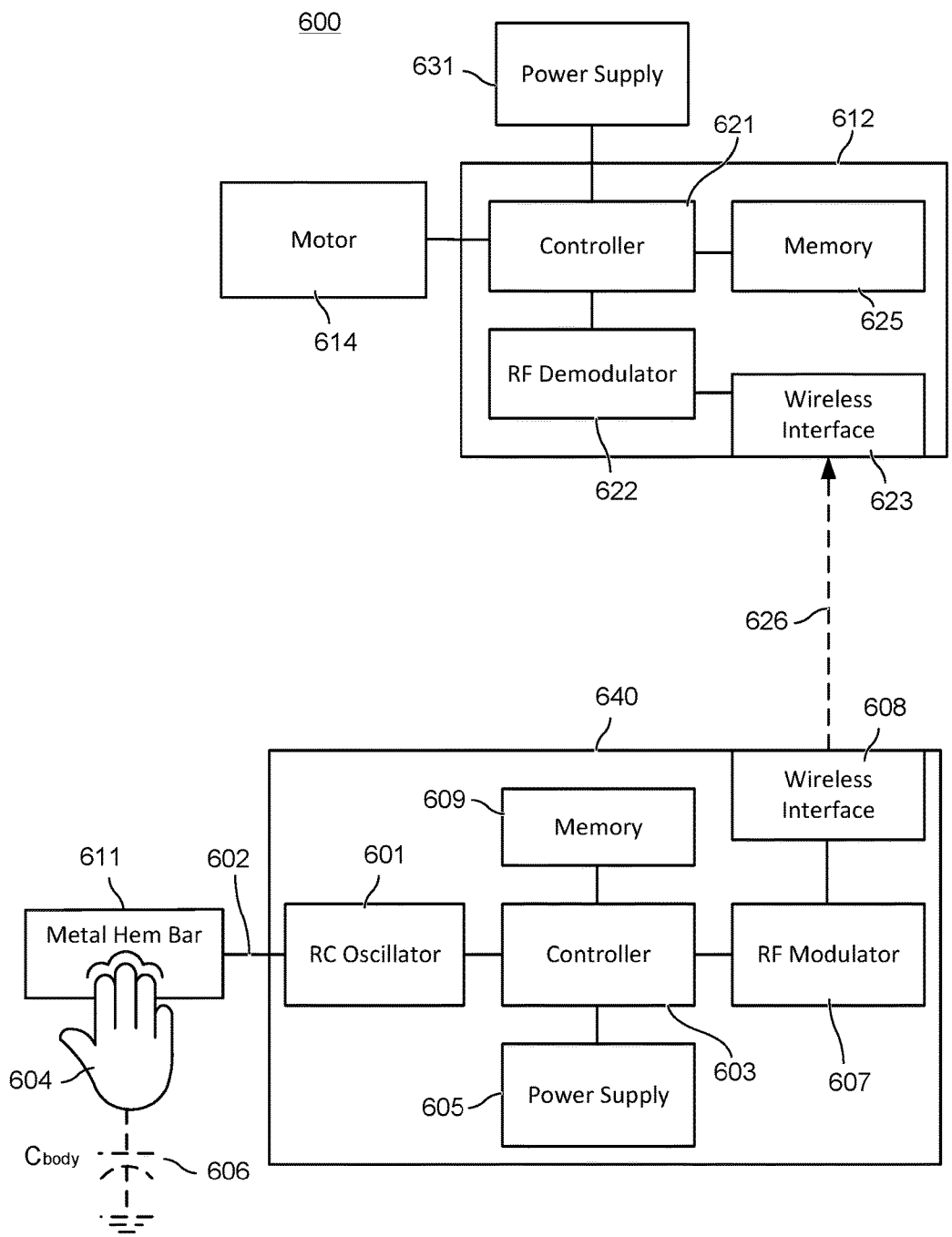
Figure 9A:
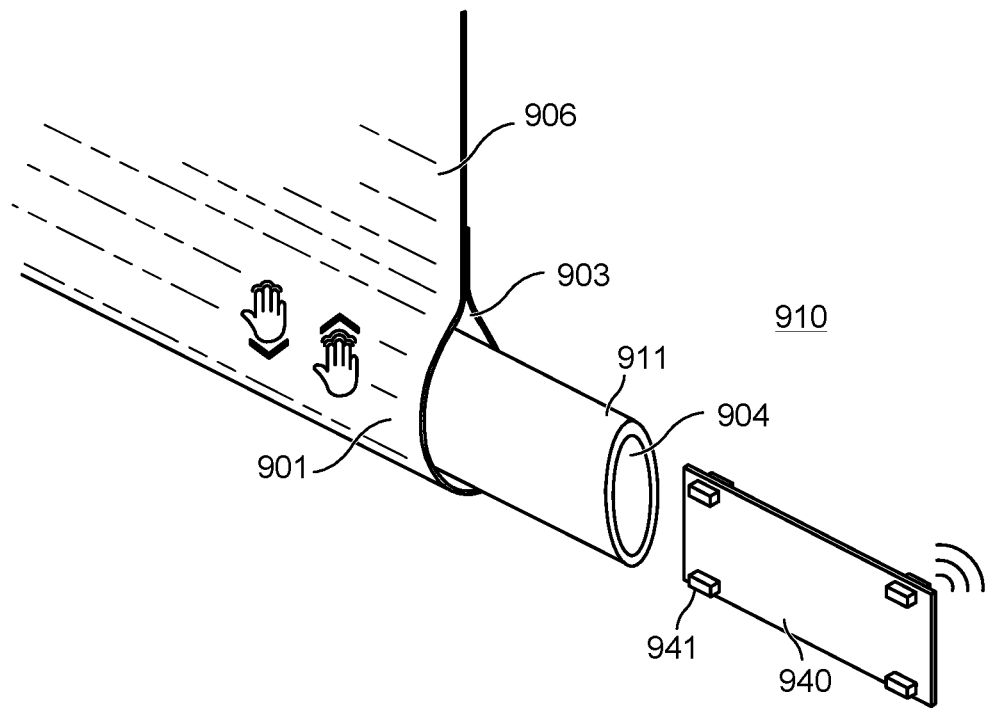
Figure 9B:
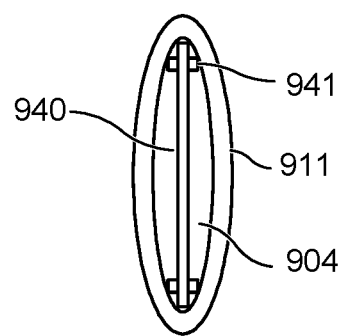

FIG. 1A illustrates a front perspective view of a roller shade with a touch sensing hem bar assembly according to one embodiment;

FIG. 1B illustrates an exploded front perspective view of the roller shade with the touch sensing hem bar assembly according to one embodiment;

FIG. 2 illustrates an exploded front perspective view of a touch sensing hem bar assembly according to another embodiment;

FIG. 3 illustrates an exploded front perspective view of a touch sensing hem bar assembly according to another embodiment;

FIG. 4 illustrates an exploded front perspective view of a touch sensing hem bar assembly according to another embodiment;

FIG. 5 illustrates an exploded front perspective view of a touch sensing hem bar assembly according to another embodiment;

FIG. 6 illustrates a block diagram of the motor control module and the touch sensing module according to one embodiment;

FIG. 7 illustrates a table including objects identifying the operating commands of the motor control module according to one embodiment;

FIG. 8 illustrates a table including objects identifying the operating commands of the motor control module according to another embodiment;

FIG. 9A illustrates an exploded front perspective view of a touch sensing hem bar assembly according to another embodiment; and FIG. 9B illustrates a side view of the touch sensing hem bar assembly shown in FIG. 9A.

DETAILED DESCRIPTION OF THE INVENTION

The embodiments are described more fully hereinafter with reference to the accompanying drawings, in which embodiments of the inventive concept are shown. In the drawings, the size and relative sizes of layers and regions may be exaggerated for clarity. Like numbers refer to like elements throughout. The embodiments may, however, be embodied in many different forms and should not be construed as limited to the embodiments set forth herein. Rather, these embodiments are provided so that this disclosure will be thorough and complete, and will fully convey the scope of the inventive concept to those skilled in the art. The scope of the embodiments is therefore defined by the appended claims. The detailed description that follows is written from the point of view of a control systems company, so it is to be understood that generally the concepts discussed herein are applicable to various subsystems and not limited to only a particular controlled device or class of devices, such as roller shades.

Reference throughout the specification to "one embodiment" or "an embodiment" means that a particular feature, structure, or characteristic described in connection with an embodiment is included in at least one embodiment of the embodiments. Thus, the appearance of the phrases "in one embodiment" on "in an embodiment" in various places throughout the specification is not necessarily referring to the same embodiment. Further, the particular feature, structures, or characteristics may be combined in any suitable manner in one or more embodiments.

LIST OF REFERENCE NUMBERS FOR THE ELEMENTS IN THE DRAWINGS IN NUMERICAL ORDER

The following is a list of the major elements in the drawings in numerical order.

100 Roller Shade
102 Roller Tube
104 Roller Shade Drive Unit
105a Mounting Bracket
105b Mounting Bracket
106 Shade Material
108a First End
108b Second End
110 Hem Bar Assembly
111 Bar
112 Motor Control Module
114 Motor
116 Crown Adapter
117 Drive Wheel 122 Channels
124 Projections
125 Teeth
126 Flange
128 Power Cord
130 Circuit
131 Three-Button Interface
140 Touch Sensing Module
141 Light Feedback
142 Single Touch
143 Double Touch
144 Outer Casing
146a Channel
146b Channel
147 Clips
148 Projections
210 Hem Bar Assembly
211 Bar
212 Ring Contact
213 Wire
214 End Cap
216 Opening
217 Clips
218 Projections
240 Touch Sensing Module
310 Hem Bar Assembly
312 Spring Contact
314 End Cap
317 Clips
318 Projections
340 Touch Sensing Module
401 Pocket
403 Opening
406 Shade Material
410 Hem Bar Assembly
411 Bar
412 Indicia
414 End Cap
440 Touch Sensing Module
441 Clamp
442 Holes
443 Hex Drive Screws
444 Casing
501 Pocket
502 Teeth
503 Casing
504 Teeth
510 Hem Bar Assembly
511 Bar
514 End Cap
540 Touch Sensing Module
600 Block Diagram
601 RC Oscillator
602 Contact
603 Controller
604 User
605 Power Supply
606 Body Capacitance
607 RF Modulator
608 Wireless Interface
609 Memory
612 Motor Control Module
614 Motor
621 Controller
622 RF Demodulator
623 Wireless Interface
625 Memory
626 Wireless Communication Link
631 Power Supply
640 Touch Sensing Module
700 Table
701-716 Objects
800 Table
801-820 Objects
901 Pocket
903 Opening
904 Opening
906 Shade Material
910 Hem Bar Assembly
911 Bar
940 Touch Sensing Module
941 Biasing Members or Spacers

LIST OF ACRONYMS USED IN THE SPECIFICATION IN ALPHABETICAL ORDER

The following is a list of the acronyms used in the specification in alphabetical order.
ASIC Application Specific Integrated Circuit
AV Audiovisual
HVAC Heating, Ventilation and Air Conditioning (HVAC)
IR Infrared
RAM Random-Access Memory
RF Radio Frequency
ROM Read-Only Memory
UID Unique Identification Number

MODE(S) FOR CARRYING OUT THE INVENTION

For 40 years Crestron Electronics Inc., has been the world's leading manufacturer of advanced control and automation systems, innovating technology to simplify and enhance modern lifestyles and businesses. Crestron designs, manufactures, and offers for sale integrated solutions to control audio, video, computer, and environmental systems. In addition, the devices and systems offered by Crestron streamlines technology, improving the quality of life in commercial buildings, universities, hotels, hospitals, and homes, among other locations. Accordingly, the systems, methods, and modes of the aspects of the embodiments described herein, as embodied as 100, 110, 210, 310, 410, 510, 600, and 910 can be manufactured by Crestron Electronics Inc., located in Rockleigh, N.J.

The different aspects of the embodiments described herein pertain to the context of motorized shades, but is not limited thereto, except as may be set forth expressly in the appended claims. While a motorized shade is described herein for covering a window, the motorized shade may be used to cover doors, wall openings, or the like. Additionally, while the embodiments described herein reference roller shades, the embodiments described herein may be adapted in other types of window, door, or wall opening coverings, such as inverted rollers, Roman shades, Austrian shades, pleated shades, blinds, shutters, skylight shades, garage doors, or the like.

Disclosed herein are systems, methods, and modes for a local control of a motorized roller shade, more particularly a touch actuated roller shade, and more particularly a roller shade that can be actuated by touching the hem bar. According to some aspects of the embodiments, the user can touch any portion of the hem bar surface to cause the roller shade to automatically roll up, roll down, or stop rolling. According to another aspect, the user may substantially simultaneously control a plurality of roller shades within a room by touching one of the hem bars.

Referring to FIGS. 1A and 1B, there is shown a roller shade 100 according to one aspect of the embodiments. Particularly, FIG. 1A illustrates a front perspective view of the roller shade 100 and FIG. 1B illustrates an exploded front perspective view of the roller shade 100. Roller shade 100 generally comprises a roller tube 102, roller shade drive unit 104, shade material 106, and a hem bar assembly 110. Shade material 106 is connected at its top end to the roller tube 102 and at its bottom end to the hem bar assembly 110. Shade material 106 wraps around the roller tube 102 and is unraveled from the roller tube 102 to cover a window, a door, a wall opening, or the like. In various embodiments, the shade material 106 comprises fabric, plastic, vinyl, or other materials known to those skilled in the art.

Roller tube 102 is generally cylindrical in shape and longitudinally and laterally extends from a first end 108a to a second end 108b. In various embodiments, the roller tube 102 comprises aluminum, stainless steel, plastic, fiberglass, or other materials known to those skilled in the art. The first end 108a of the roller tube 102 receives the roller shade drive unit 104. The second end 108b of the roller tube 102 receives an idler assembly (not shown). The roller shade 100 is mounted on a window, for example, using mounting brackets 105a and 105b. The roller shade 100 is rolled down and rolled up via the roller shade drive unit 104. Particularly, the shade material 106 is lowered from an opened or rolled up position, when substantially the entire shade material 106 is wrapped about the roller tube 102, to a closed or rolled down position, when the shade material 106 is substantially unraveled.

As shown in greater detail in FIG. 1B, the roller shade drive unit 104 comprises a motor control module 112, a motor 114, a crown adapter 116, and a drive wheel 117. In various embodiments, the various components of the roller shade drive unit 104 comprise aluminum, stainless steel, plastic, fiberglass, rubber, other materials known to those skilled in the art, or any combinations thereof. The crown adapter 116 and drive wheel 117 are generally cylindrical in shape and are inserted into and operably connected to roller tube 102 at its first end 108a. Crown adapter 116 and drive wheel 117 comprise a plurality of channels 122 extending circumferentially about their external surfaces. Channels 122 mate with complementary projections 124 radially extending from an inner surface of roller tube 102 such that crown adapter 116, drive wheel 117, and roller tube 102 rotate together during operation. Crown adapter 116 can further comprise a plurality of teeth 125 extending circumferentially about its external surface to form a friction fit between the crown adapter 116 and the inner surface of the roller tube 102. Crown adapter 116 can further comprise a flange 126 radially extending therefrom. Flange 126 prevents the crown adapter 116 from sliding entirely into the roller tube 102. The crown adapter 116 removably and releasably couples the roller shade drive unit 104 to the roller tube 102.

In operation, the motor 114 drives the drive wheel 117, which in turn rotates the roller tube 102 and crown adapter 116 with respect to the motor 114, while the motor 114 and motor control module 112 remain stationary. The roller shade drive unit 104 can comprise similar configuration to the CSM-QMTDC-256-2-EX Digital QMT™ Shade Motor, available from Crestron Electronics, Inc. of Rockleigh, N.J. The Crestron® CSM-QMTDC-256-2-EX shade motor utilizes the quiet, precision-controlled Quiet Motor Technology (QMT) to control the movement of the shade, keep track of the shade's position, and adjust the shade to the user's desired preset positions.

The motor control module 112 operates to control the motor 114, directing the operation of the motor, including its direction, speed, and position. The motor control module 112 comprises fully integrated electronics, including circuit 130. Power can be supplied to the motor control module 112 through a power cord 128 by a dedicated power supply, such as the CSA-PWS40 or CSA-PWS10S-HUB, available from Crestron Electronics, Inc. of Rockleigh, N.J. In another embodiment, the motor control module 112 may be battery operated. Motor control module 112 can further comprise a local three-button interface 131 that allows users to test the roller shade 100 after installation and also to set the shade limits.

According to the aspects of the present embodiments, the roller shade 100 is activated by touching the surface along any portion of the hem bar assembly 110. The hem bar assembly 110 comprises a weighted bar 111 that runs longitudinally and laterally across the width of the shade. Bar 111 minimizes any movement in the field and properly tensions the shade material 106 to allow for a straight hang of the shade material 106. The bar 111 is made from an electrically conductive material, such as aluminum, or other electrically conductive materials known to those skilled in the art. The hem bar assembly 110 further comprises a touch sensing module 140 that detects a user touching the bar 111. The touch sensing module 140 energizes the entire length of bar 111, allowing it to act as a touch control to actuate the roller shade 100, as will be described in a greater detail below.

According to one aspect of the embodiments, as shown in FIG. 1B, the touch sensing module 140 comprises an outer casing 144 enclosing touch sensing circuitry therein. The outer casing 144 can comprise a shape with a cross section complementary to the shape and cross section of bar 111. Particularly, the bar 111 may be cut short and touch sensing module 140 can be attached to an end of the bar 111, acting as its complementary extension. The bar 111 and touch sensing module 140 can comprise channels 146a and 146b, respectively, for receiving the shade material 106 therein. Outer casing 144 of the touch sensing module 140 can also comprises an electrically conductive material, such that its surface is also energized and can be touched to actuate the roller shade 100. As such, the user can touch any portion of the hem bar assembly 110 to actuate the roller shade 100. The hem bar assembly 110 can be printed with indicia identifying the raise and lower functions via a single touch 142 and double touch 143 gestures. In addition, the touch sensing module 140 can further comprise a light feedback 141, such as an LED indicator, to provide visual feedback to the user when the hem bar assembly 110 is touched.

The touch sensing module 140 comprises clips 147 that engage with projections 148 extending from an inner surface of the bar 111 to attach the touch sensing module 140 to bar 111. Clips 147 preferably comprise electrically conductive material connected to the touch sensing circuit inside the touch sensing module 140, thereby serving as an electrical contact. As the touch sensing module 140 is clipped onto the bar 111, clips 147 connect the electrically conductive material of the bar 111 to the touch sensing circuit inside the touch sensing module 140. This enables to turn the entire surface of the bar 111 into a capacitive touch sensor.

In one embodiment, the touch sensing module 140 comprises an RC oscillator that uses the body of the user touching the electrically conductive material of the hem bar assembly 110 as a capacitor. The conductive material of the hem bar assembly 110 may be covered by shade material 106 or by a plastic layer as the user does not need to actually touch the conductive material, but only come within sufficient distance to the conductive material of the hem bar assembly 110. When a person touches the hem bar assembly 110, the capacitance of the hem bar assembly 110 changes, also changing the frequency of the oscillator. When a large enough difference in frequency is detected, the touch sensing module 140 registers it as a touch of the hem bar assembly 110, producing a control signal. The control signal is reported wirelessly to the motor control module 112.

The touch sensing module 140 and the motor control module 112 each comprise a wireless interface, such as an antenna. Upon detecting a user touching the hem bar assembly 110, the touch sensing module 140 wirelessly sends the control signal to the motor control module 112, which in response lowers or raises the shade material 106. In various embodiments, touch sensing module 140 communicates with the motor control module 112 via radio frequency (RF), infrared (IR), or other communication technologies known to those skilled in the art. In one embodiment, the touch sensing module 140 communicates with the motor control module 112 using the infiNET EX® protocol from Crestron Electronics, Inc. of Rockleigh, N.J. infiNET EX® is an extremely reliable and affordable protocol that employs steadfast two-way RF communications throughout a residential or commercial structure without the need for physical control wiring. infiNET EX® utilizes 16 channels on an embedded 2.4 GHz mesh network topology, allowing each infiNET EX® device to function as an expander, passing command signals through to every other infiNET EX® device within range (approximately 150 feet or 46 meters indoors), ensuring that every command reaches its intended destination without disruption. Accordingly, in additional embodiments, the motor control module 112 can integrate seamlessly with other control system using the wireless interface to be operated from keypads, wireless remotes, touch screens, and wireless communication devices, such as smart phones. Additionally, the motor control module 112 can be integrated within a large scale building automation system or a small scale home automation system and be controllable by a central control processor, such as the PRO3 control processor available from Crestron Electronics, Inc., that networks, manages, and controls a building management system. In another embodiment, communication is employed using the ZigBee® protocol from ZigBee Alliance.

According to some aspects of the embodiments, the touch sensing module 140 can decipher between various gestures. For example, the touch sensing module 140 can decipher between a single touch gesture and a double touch gesture. As illustrated in FIG. 1A, a single touch gesture 142 can be designated to command the motor control module 112 to lower the shade material 106, while a double touch gesture 143 can be designated to command the motor control module 112 to raise the shade material 106. In another embodiment, touching the conductive surface of the hem bar assembly 110 while the roller shade 100 is in motion will cause the motor control module 112 to stop the operation of the roller shade 100. In yet another embodiment, holding the hem bar will cause the motor to slowly lower the shade material 106 until the hem bar is released. Once the hem bar is released, the shade material 106 will stop lowering. As such, a user can choose how low the shade material 106 should hang. Similarly, a tap-hold gesture, will slowly raise the shade material 106 until the hem bar is released. Once the hem bar is released, the shade material 106 will stop rising.

According to one embodiment, the touch sensing module 140 is paired with the motor control module 112 of the roller shade 100 and can be chosen to operate at one channel selected from a plurality of channels. For example, a room can include three roller shades 100, each operating on a different frequency channel such that touching the hem bar of a first roller shade will only cause operation of that first roller shade. Touching the hem bar of a second roller shade will only cause operation of the second roller shade, and so forth. In another embodiment, the touch sensing module 140 can comprise a unique identification number (UID) that transmits along with the control signal. As such, a motor control module 112 of a first roller shade can identify and act upon only a control signal transmitted from a touch sensing module 140 belonging to the first roller shade.

In yet another embodiment, the motor control module 112 of one roller shade can receive and act upon control signals wirelessly transmitted from touch sensing modules of a plurality of roller shades installed in a room. This enables a user to touch a single hem bar assembly 110 to substantially simultaneously control a plurality of roller shades within a room. For example, a touch sensing module 140 of one roller shade can recognize a third gesture, such as a triple touch, indicating that the user wishes to raise all of the roller shades within a room. The touch sensing module 140 can transmit the third gesture to all of the motor control modules 112 within the room, which will act upon this third gesture to raise their respective shade material. Other types of gestures and commands are also contemplated by the present invention.

In another embodiment, upon detecting a user touching the hem bar assembly 110, the touch sensing module 140, or motor control module 112, can transmit control signals to other devices, including, but not limited to heating, ventilation and air conditioning (HVAC), lighting, shading, security, appliances, door locks, and audiovisual (AV) equipment, among others. Control signals can also be transmitted to a central control processor of a building or a home automation system. For example, a touch of the hem bar can also control lighting within a room, such that touching the hem bar to lower the shade will turn off lights in a room.

The touch sensing module 140 may be incorporated in the hem bar assembly 110 and attached to the bar 111 in various ways. Some additional examples are shown in FIGS. 2-5, and 9A-B. Referring to FIG. 2, illustrated is an exploded front perspective view of a touch sensing hem bar assembly 210 according to another embodiment of the invention. Instead of being attached to an end of the bar, a touch sensing module 240 can be hidden from view and reside within an opening 216 of the bar 211. The touch sensing module 240 can comprise a conductive resilient ring contact 212 connected to the touch sensing circuitry within module 240 via wire 213. The hem bar assembly 210 can be provided with an end cap 214 for closing the side opening 216 of the bar 211. End cap 214 can comprise clips 217 that connect to projections 218 extending from the inner surface of the bar 211. During installation, module 240 is inserted within opening 216 of the bar 211 and ring contact 212 fits around the clips 217. Clips 217 connect to projections 218 and bias the ring contact 212 against the inner surface of the bar 211. Accordingly, ring contact 212 electrically connects the touch sensing circuitry within the module 240 with the bar 211 so that it can act as a touch sensor.

FIG. 3 illustrates an exploded front perspective view of a touch sensing hem bar assembly 310 according to another embodiment of the invention. In this embodiment, the touch sensing module 340 is connected to an end cap 314. The touch sensing module 340 can comprise a resilient spring contact 312 extending from its outer surface, which in turn is connected to the touch sensing circuitry within the module 340. The end cap 314 comprises clips 317 provided for connecting to complementary projections 318 disposed on the inner surface of the bar 311. During installation, the touch sensing module 340 is inserted within the bar 311 and clips 317 connect to projections 318, securing the touch sensing module 340 within the bar 311. Within the bar 311, the spring contract 312 is biased against the inner surface of the bar 311, connecting the touch sensing circuitry within the module 340 with the bar 311 so that it can act as a touch sensor.

It yet another embodiment, an open pocket constructed hem bar assembly 410, shown in FIG. 4, may include a touch sensing module 440. A pocketed hem bar construction is preferred by designers due to its clean and unobtrusive design. It does not add an additional architectural element to a partially drawn shade. The hem bar assembly 410 comprises a pocket 401 formed from and integral with the shade material 406. Pocket 401 is constructed by folding the bottom portion of the shade material 406 and sealing the pocket 401 either by a seam or heat seal. The pocket 401 includes an opening 403 that receives and conceals a weighted bar 411. Bar 411 runs longitudinally and laterally across the width of the shade to minimize any movement in the field and allow for a straight hang of the shade material 406. Bar 411 may be secured to the inside surface of the pocket 401 via an adhesive, or the like. Bar 411 comprises an electrically conductive material and is cut short to provide space for the touch sensing module 440 within the pocket 401.

The touch sensing module 440 comprises outer casing 444 enclosing circuitry therein. The outer casing 444 comprises a shape with a cross section complementary to the shape and cross section of bar 411. Touch sensing module 440 is connected to the bar 411 using a clamp 441 having a plurality of threaded holes 442 extending therethrough. Bar 411 is inserted into a first end of the clamp 441 and touch sensing module 440 is inserted into a second and opposite end of the clamp 441. Hex drive screws 443 are screwed through threaded holes 442 to retain the bar 411 and touch sensing module 440. Casing 444 is electrically coupled to the touch sensing circuitry. Casing 444 and clamp 441 also comprise electrically conductive material such that upon connecting the touch sensing module 440 with bar 411, the touch sensing circuitry of the touch sensing module 440 is electrically connected to the electrically conductive material of the bar 411. An end cap 414 may be supplied to close the pocket 401 and provide a finished appearance to the end of the hem bar assembly 410. The shade material 406 forming the pocket 401 can be printed with indicia 412 identifying the function of the hem bar assembly 410. In another embodiment, instead of a retaining clamp, casing 444 can comprise spring clips that attach the touch sensing module 440 to the bar 411. As such, the touch sensing module 440 can be easily installed and removed in the field.

FIG. 5 illustrates another embodiment of a pocketed hem bar assembly 510. A hollow weighted bar 511 is provided with an opening therein for receiving and concealing the touch sensing module 540. Bar 511, in turn, fits and is concealed within pocket 501 of the hem bar assembly 510. The touch sensing module 540 comprises casing 503 enclosing circuitry therein. Casing 503 can be electrically coupled to the circuitry and comprise teeth 502 on its outer surface for forming a friction fit with inner surface of the bar 511, and thereby be connected to the electrically conductive material of the bar 511. Alternatively, or in addition, bar 511 can comprise teeth 504 on its inner surface for forming a friction fit with the outer surface of casing 503 of the touch sensing module 540. An end cap 514 may be provided to either seal the opening of bar 511 or the opening of the pocket 501 of the pocketed hem bar assembly 510.

FIG. 9A illustrates another embodiment of a pocketed hem bar assembly 910. A hollow weighted bar 911 is provided with an opening 904 therein for receiving and concealing the touch sensing module 940. Bar 911, in turn, is inserted through opening 903 and is concealed within pocket 901 formed by shade material 906. In this embodiment, weighted bar 911 is a standard hollow weighted hem bar made from electrically conductive material that does not need additional modifications. The touch sensing module 940 comprises a circuit board that is sized to snugly fit within the weighted bar 911. Touch sensing module 940 can comprise protective non-conductive layers to provide protection to the touch sensing circuitry. Touch sensing module 940 can further comprise biasing members or spacers 941 disposed on its surface. Biasing members or spacers 941 comprise electrically conductive material coupled to the touch sensing circuitry of the touch sensing module 940. As shown in FIG. 9B, touch sensing module 940 snugly fits within the opening 904 of the weighted bar 911, with biasing members or spacers 941 contacting the inner surface of the weighted bar 911. Thereby the touch sensing circuitry of the touch sensing module 940 is electrically connected to the weighted bar 911. According to one embodiment, when the touch sensing module 940 is no longer active, a new touch sensing module is pushed into the weighted bar 911, causing the old touch sensing module to further push into the weighted bar 911.

FIG. 6 is an illustrative block diagram 600 of the motor control module 612 and the touch sensing module 640 of the roller shade 100 according to one embodiment of the invention, showing the operation and communication of their respective circuits. The touch sensing module 640 can comprise an RC oscillator 601, a controller 603, a memory 609, a power supply 605, an RF modulator 607, and a wireless interface 608. Power supply 605 can comprise a battery that provides power to the touch sensing circuit and its components, including the RC oscillator 601, controller 603, RF modulator 607, and wireless interface 608. Controller 603 can represent one or more microprocessors, and the microprocessors can be "general purpose" microprocessors, a combination of general and special purpose microprocessors, or application specific integrated circuits (ASICs). Controller 603 can provide processing capability to provide processing for one or more of the techniques and functions described herein. Memory 609 can be communicably coupled to controller 603 and can store data and executable code. In another embodiment, memory 609 is integrated into the controller 603. Memory 609 can represent volatile memory such as random-access memory (RAM), but can also include nonvolatile memory, such as read-only memory (ROM) or Flash memory.

Controller 603 of the touch sensing module 640 can send wireless signals via wireless interface 608 through a wireless communication link 626 to motor control module 612 in the roller shade drive unit 104, or to motor control modules of other shades, using the infiNET EX® or ZigBee® protocols. In an embodiment of the invention, the wireless interface 608 can comprise an RF or an IR transceiver. An RF modulator 607 may be used to modulate the signals to be transmitted from the controller 603.

The motor control module 612 can comprise a controller 621, a memory 625, an RF demodulator 622, and a wireless interface 623. An external power supply 631 can provide power to the circuit of the motor control module 612. Controller 621 can represent one or more microprocessors, and the microprocessors can be "general purpose" microprocessors, a combination of general and special purpose microprocessors, or ASICs. Controller 621 can provide processing capability to provide processing for one or more of the techniques and functions described herein. Memory 625 can be communicably coupled to controller 621 and can store data and executable code. In another embodiment, memory 625 is integrated into the controller 621. Memory 625 can represent volatile memory such as RAM, but can also include nonvolatile memory, such as ROM or Flash memory. Controller 621 can receive signals from the touch sensing module 640, or from touch sensing modules of other shades, via wireless interface 623 through the wireless communication link 626 using the infiNET EX® or Zig-Bee® protocols. The wireless interface 623 can comprise an RF or IR transceiver. An RF demodulator 622 may be used to demodulate the signals received from the touch sensing module 640.

The touch sensing module 640 detects whether the metal hem bar 611 has been touched by a user 604 and sends a signal of the detected touch to the motor control module 612. In one embodiment, this can be accomplished as follows. The RC oscillator 601 can use an internal capacitor to oscillate at a certain frequency. The conductive material of the metal hem bar 611 is electrically connected to the RC oscillator 601 via a contact 602, as described above. The hem bar 611 by itself has a certain capacitance. Thereby, the RC oscillator 601 keeps charging and discharging the conductive material of the metal hem bar 611. When the user 604 touches the hem bar 611, the user's body acts as an additional capacitor 606. This property is called body capacitance ($C_{body}$). RC oscillator 601 uses the capacitance of the human body as an additional capacitor. Thus, the overall capacitance of the RC oscillator 601 is increased, causing the frequency of the RC oscillator 601 to change. The increased capacitance lowers the frequency of the RC oscillator. The controller 603 detects this change in frequency. When a large enough difference in frequency is detected, i.e., the frequency is decreased below a predetermined threshold value, the controller 603 registers this change in frequency as a touch of the hem bar 611. In another embodiment, the touch sensing module 640 does not comprise a controller 603, but comprises a frequency comparator to detect the change in frequency. In yet another embodiment, the RC oscillator 601 is integrated into the controller 603. In a preferred embodiment, the controller 603 (or a frequency comparator) can decipher between a touch and proximity to window, shade parts, or other objects, to prevent false triggers by the touch sensing module 640.

In one embodiment, touch sensing circuit of the touch sensing module 640 is in sleep mode when no touch signal is detected. In the sleep mode, the touch sensing circuit retains an ultra-low power state. The module 640 changes to a wake up mode when a touch of the hem bar is detected, allowing for battery operation. In the wake up mode, the touch sensing circuit enters an active power state to perform full operating functions.

The detected touch is sent as a signal to the motor control module 612 via wireless interface 608 through the wireless communication link 626. This signal can be first modulated via the RF modulator 607 to a format perceivable by the motor control module 612. In addition, memory 609 can store the UID of the touch sensing module 640, which is transmitted to the motor control module 612 to identify the touch sensing module 640.

The signal is received at the circuit of the motor control module 612 via wireless interface 623, demodulated via RF demodulator 622, and processed via controller 621. Controller 621 uses the signal to decide how to operate the motor 614. Memory 625 can store various objects identifying the operating command to be executed by the controller 621 based on the state of the roller shade. An object can comprise a combination of a data structure and a procedure to manipulate the data. The various objects can be represented in a table.

In one embodiment, touch sensing module 640 only detects a single touch and transmits a signal with the detected touch to the motor control module 612. Controller 621 can keep track of the state of the roller shade 100 and operate the motor 614 of the roller shade upon receiving the touch signal based on that state. The states of the roller shade 100 can be temporarily stored in the memory 625. Alternatively, upon receipt of a touch signal, the controller 621 can determine the state of the roller shade 100.

FIG. 7 illustrates exemplary objects in a form of a table 700 for use by a controller 621. Table 700 comprises Shade_state objects 701 and Operating_command objects 702. Upon receiving a signal from the touch sensing module 640, the controller 621 detects the state of the roller shade 100 and queries table 700 to determine the operating command. For example, when the controller 621 receives touch signal while the roller shade 100 is in a fully lowered (or closed) position, a Fully_lowered object 704 would indicate to the controller 621 to raise (or open) the shade. The shade rises until the controller 621 determines that it has reached a fully raised state, at which time the controller 621 stops raising the shade. However, when the controller 621 receives a touch signal while the roller shade 100 is in the process of being raised, a During_raise object 706 also indicates to the controller 621 to stop raising the shade. As such, the controller 621 stops raising the shade either until the shade is fully opened or if it receives a touch signal during the raise operation, whichever occurs first. After the shade stops and if it is partially drawn, a subsequent touch signal received within a predetermined period of time T would trigger the Partially_drawn_≤_after_raise_stop object 708 causing the controller 621 to lower the shade. As such, the user may slightly adjust the height of the roller shade if it was raised too far.

Similarly, when the controller 621 receives a touch signal while the roller shade 100 is in a fully raised (or opened) position, the Fully_raised object 710 would indicate to the controller 621 to lower (or close) the shade. The shade lowers until the controller 621 determines that it has reached a fully lowered state, at which time the controller 621 stops lowering the shade. However, when the controller receives a touch signal while the roller shade 100 is in the process of being lowered, a During_lower object 712 would indicate to the controller 621 to stop lowering the shade. As such, the controller 621 stops lowering the shade either until the shade is fully closed or if it receives a touch signal during the lower operation, whichever occurs first. After the shade is stopped being lowered and if it is partially drawn, a subsequent touch signal received within a predetermined period of time T would trigger the Partially_drawn_≤_after_lower_stop object 714 causing the controller 621 to raise the shade. As such, the user may slightly adjust the height of the roller shade if it was lowered too far. Finally, if the controller 621 receives a touch signal outside of the predetermined period of time T and while the roller shade 100 is in a partially drawn position, a Partially_drawn_>T object 716 would indicate to the controller 621 to raise the shade. The above operating process is merely exemplary and can vary without departing from the scope of the present embodiments.

In another embodiment, controller 603 of the touch sensing module 640 can decipher between various gestures and transmit the detected gesture to controller 621 of the motor control module 612. The properties of each gesture and the respective operating commands can be stored in memory 609 as objects. The controller 621 of the motor control module 612 can keep track of the state of the roller shade 100 and operate the motor 614 of the roller shade based on that state and the detected gesture received from controller 603. In one embodiment, the controller 603 can decipher between a single touch and a double touch. The controller 603 can register a double touch when the controller 603 detects two touches occurring within a predetermined amount of time. Controller 603 of the touch sensing module 640 can transmit a signal to controller 621 of the motor control module 612 indicating the type of detected gesture, i.e., whether it is a single touch or a double touch. For example, a single touch signal can indicate to lower the roller shade, while a double touch signal can indicate to raise the shade.

In yet another embodiment, the controller 603 of the touch sensing module 640 can detect a hold and release gesture. The controller 603 can register a hold when the controller 603 detects a decrease in frequency of the RC oscillator below a predetermined threshold value over a predetermined period of time. The controller 603 can register a release when the frequency is subsequently increased above the predetermined threshold value. In addition, the controller 603 can detect a tap-hold and release gesture. For example, a hold of the hem bar gesture can indicate to slowly lower the shade material 106 while the user is holding the hem bar. Once the hem bar is released, the shade material 106 will stop lowering. As such, a user can choose how low the shade material 106 should hang. Similarly, a tap-hold gesture, will slowly raise the shade material 106 while the user is holding the hem bar. Once the hem bar is released, the shade material 106 will stop being raised. In another embodiment, controller 621 of the motor control module 612 instead deciphers between the various gestures.

FIG. 8 illustrates exemplary objects in a form of a table 800 for use by a controller 621. Table 800 comprises Gesture objects 801, Shade_state objects 802, and Operating_command objects 803. Upon receiving a signal with the detected gesture from the touch sensing module 640, the controller 621 detects the state of the roller shade and queries table 800 to determine the operating command. For example, when the controller 621 receives a single touch signal while the roller shade 100 is stationary and not fully lowered, Single_touch and Stationary_NOT_fully_lowered objects 804 would indicate to the controller 621 to lower the shade. The shade lowers until the controller 621 determines that it has reached a fully lowered state, at which time the controller 621 stops lowering the shade. When the controller 621 receives a double touch signal while the roller shade 100 is stationary and not fully raised, Double_touch and Stationary_NOT_fully_raised objects 806 would indicate to the controller 621 to raise the shade. The shade is raised until the controller 621 determines that it has reached a fully raised state, at which time the controller 621 stops raising the shade. When the controller 621 receives either a single touch or a double touch signal while the roller shade 100 is moving, objects 808 and 810 would indicate to the controller 621 to stop lowering or raising the shade.

When the controller 621 receives a hold signal, when the roller shade 100 is stationary, but not fully lowered, the Hold and Stationary_NOT_fully_lowered objects 812 would indicate to the controller 621 to slowly lower the shade. In other words, the controller 621 lowers the shade at a predetermined speed slower than speed occurring in object 804 such that the user can comfortably maintain a hold of the hem bar. When the user subsequently releases holding the hem bar while the roller shade 100 is moving, the controller 621 receives a Release_hold signal, and the Release_hold and Moving objects 814 would indicate to the controller 621 to stop lowering the shade. Regardless of receiving the Release_hold signal, the controller 621 stops lowering the shade when the controller 621 determines that it has reached a fully lowered state.

When the controller 621 receives a tap-hold signal, when the roller shade 100 is stationary, but not fully raised, the Tap_hold and Stationary_NOT_fully_raised objects 816 would indicate to the controller 621 to slowly raise the shade. In other words, the controller 621 raises the shade at a predetermined speed slower than speed occurring in object 806 such that the user can comfortably maintain a hold of the hem bar. When the user subsequently releases holding the hem bar while the roller shade 100 is moving, the controller 621 receives a Release_tap_hold signal, and the Release_tap_hold and Moving objects 818 would indicate to the controller 621 to stop raising the shade. Again, regardless of receiving the Release_tap_hold signal, the controller 621 stops raising the shade when the controller 621 determines that it has reached a fully opened state. When the controller 621 receives either a hold or a tap-hold signal while the roller shade 100 is moving, objects 819 and 820 would indicate to the controller 621 to stop lowering or raising the shade.

It is contemplated that the touch sensing module 640 can detect other types of gestures enabling custom operations of the roller shade drive unit 104. In addition, as discussed above, multiple roller shades can be set up to be controlled by touching any one touch sensing module 640 located within a room. In another embodiment, the hem bar may comprise a touch sensing panel with multi-touch technology longitudinally superimposed over the outer surface of the hem bar that can recognize various complex gestures and wirelessly transmit same to the motor control module 612.

In addition, or alternatively, the touch sensing module 640 of the present embodiments can be used as a safety mechanism. As the roller shade lowers, the weighed hem bar 611 may hit a person causing injury. This is especially a concern in large shades with heavy hem bars. Additionally, the roller shade may hit an object, such as furniture, window sill, floor, or the like, causing damage to the object or to the roller shade itself. The controller 621 of the motor control module 612 can detect that the hem bar 611 has hit or about to hit an obstacle when the controller 621 receives a touch signal from the touch sensing module 640 during lowering of the shade material 106. The controller 603 can register a touch of an obstacle when the conductive surface of the hem bar 611 has been touched or brought close to an obstacle causing the controller 603 to detect a decrease in frequency of the RC oscillator below a predetermined threshold value. Memory 625 of the controller 621 of the motor control module 612 can store one or more objects identifying the operating commands to be executed by the controller 621 upon receiving a touch signal from the touch sensing module 640 while the roller shade 100 is in the process of being lowered. In one embodiment, upon receiving a touch signal while the roller shade 100 is in the process of being lowered, the controller 621 of the motor control module 612 stops lowering the shade. In another embodiment, upon receiving a touch signal while the roller shade 100 is in the process of being lowered, the controller 621 of the motor control module 612 stops lowering the shade and then raises the shade by a predetermined amount.

In yet another embodiment, upon receiving a hold signal while the roller shade 100 is in the process of being lowered, the controller 621 of the motor control module 612 stops lowering the shade and then raises the shade until the touch sensing module 640 no longer detects the obstacle in proximity to the hem bar 611—i.e., when the touch sensing module 640 detects a release of the hold. Upon receiving a release signal from the touch sensing module 640, the controller 621 stops raising the shade. In particular, the controller 603 of the touch sensing module 640 detects a hold and sends a hold signal to the controller 621 of the motor control module 612. Upon receiving the hold signal, the controller 621 of the motor control module 612 determines whether the shade is in the process of being lowered. If it is being lowered, the controller 621 of the motor control module 612 stops lowering the shade and begins raising the shade. Subsequently, the controller 603 of the touch sensing module 640 sends a release signal to the controller 621 of the motor control module 612 when it no longer detects the obstacle in proximity to the hem bar 611. The controller 603 of the touch sensing module 640 no longer detects the obstacle in proximity to the hem bar 611 when the frequency of the RC oscillator is subsequently increased above the predetermined threshold value. The controller 621 of the motor control module 612 receives the release signal from the touch sensing module 640 and stops raising the shade. Before receiving the release signal, the controller 621 raises the shade until it determines that it has reached a fully raised state, at which time the controller 621 stops raising the shade. As such, the controller 621 stops raising the shade when it reaches a fully raised state or when it receives the release signal, whichever occurs first.

Industrial Applicability

To solve the aforementioned problems, the aspects of the embodiments are directed towards a touch actuated roller shade. The disclosed embodiments provide a system, software, and a method for a roller shade that can be actuated by touching the hem bar. It should be understood that this description is not intended to limit the embodiments. On the contrary, the embodiments are intended to cover alternatives, modifications, and equivalents, which are included in the spirit and scope of the embodiments as defined by the appended claims. Further, in the detailed description of the embodiments, numerous specific details are set forth to provide a comprehensive understanding of the claimed embodiments. However, one skilled in the art would understand that various embodiments may be practiced without such specific details.

Although the features and elements of aspects of the embodiments are described being in particular combinations, each feature or element can be used alone, without the other features and elements of the embodiments, or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

The above-described embodiments are intended to be illustrative in all respects, rather than restrictive, of the embodiments. Thus the embodiments are capable of many variations in detailed implementation that can be derived from the description contained herein by a person skilled in the art. No element, act, or instruction used in the description of the present application should be construed as critical or essential to the embodiments unless explicitly described as such. Also, as used herein, the article "a" is intended to include one or more items.

All United States patents and applications, foreign patents, and publications discussed above are hereby incorporated herein by reference in their entireties.

Alternate Embodiments

Alternate embodiments may be devised without departing from the spirit or the scope of the different aspects of the embodiments. In various embodiments, the motorized shade described herein may be used to cover a window, a door, a wall opening, or the like. In addition, the embodiments described herein may be adapted in varies types of window or door coverings, such as roller shades, inverted rollers, Roman shades, Austrian shades, pleated shades, blinds, shutters, skylight shades, garage doors, or the like.

What is claimed is:

1. A motorized window treatment comprising:
    a window covering extending from a top end to a bottom end;
    a hem bar assembly connected to the bottom end of the window covering and comprising a longitudinal bar electrically coupled to a touch sensing module, wherein the touch sensing module is carried by the hem bar assembly during operation of the window covering, and the touch sensing module is configured for:
        detecting a first gesture or a second gesture by sensing at least one direct or indirect touch of the longitudinal bar; and
        transmitting a control signal in response to the detected gesture;
    a drive unit operably connected to the top end of the window covering and comprising a motor configured to raise or lower the window covering;
    a controller in communication with the touch sensing module and comprising a memory encoding one or more processor-executable instructions, which when executed by the controller, cause acts to be performed comprising:
        receiving the control signal;
        controlling the motor to raise the window covering in response to receiving a control signal comprising the first gesture; and
        controlling the motor to lower the window covering in response to receiving a control signal comprising the second gesture.

2. The motorized window treatment of claim 1, wherein the longitudinal bar comprises an electrically conductive material.

3. The motorized window treatment of claim 1, wherein the touch sensing module energizes the longitudinal bar thereby turning the surface of the longitudinal bar into a capacitive touch sensor.

4. The motorized window treatment of claim 1, wherein the touch sensing module comprise an RC oscillator, wherein the longitudinal bar is electrically connected to the RC oscillator, and wherein the touch sensing module detects a touch of the longitudinal bar when the frequency of the RC oscillator is decreased below a predetermined threshold value.

5. The motorized window treatment of claim 1, wherein each of the touch sensing module and the controller comprises a wireless interface for wirelessly communicating the control signal.

6. The motorized window treatment of claim 1, wherein the first gesture comprises a single touch and the second gesture comprises a double touch, or vice-versa.

7. The motorized window treatment of claim 1, wherein the touch sensing module is adapted to transmit a plurality of control signals to a plurality of controllers for substantial simultaneous control of a plurality of motorized window treatments.

8. The motorized window treatment of claim 7, wherein the touch sensing module is adapted to detect a third gesture, wherein the plurality of control signals identify the detected third gesture, and wherein the plurality of controllers, in response to receiving the plurality of control signals comprising the third gesture, are adapted to controlling a plurality of motors to substantially simultaneously raising or lowering a plurality of window coverings.

9. The motorized window treatment of claim 8, wherein the third gesture comprises a triple touch.

10. The motorized window treatment of claim 1, wherein the controller is further configured for:
controlling the motor to stop lowering or raising the window covering in response to receiving a control signal from the touch sensing module while the motor is in the process of lowering or raising the window covering.

11. The motorized window treatment of claim 1, wherein the touch sensing module is adapted to detect a hold and release gesture, and wherein the controller is further configured for:
controlling the motor to raise or lower the window covering in response to the detected hold of the longitudinal bar; and
controlling the motor to stop raising or lowering the window covering in response to the detected release of the longitudinal bar.

12. The motorized window treatment of claim 1, wherein the touch sensing module is adapted to detect a tap-hold and release gesture, and wherein the controller is further configured for:
controlling the motor to raise or lower the window covering in response to the detected tap and hold of the longitudinal bar; and
controlling the motor to stop raising or lowering the window covering in response to the detected release of the longitudinal bar.

13. The motorized window treatment of claim 1, wherein the touch sensing module is further adapted to detect that the longitudinal bar has hit or about to hit an obstacle and transmit a hit signal, wherein the controller is further configured for:
controlling motor to stop lowering the window covering in response to receiving the hit signal.

14. The motorized window treatment of claim 13, wherein subsequently to stopping lowering the window covering, the controller raises the window covering by a predetermined amount.

15. A motorized window treatment comprising:
a window covering extending from a top end to a bottom end;
a hem bar assembly connected to the bottom end of the window covering and comprising a longitudinal bar electrically coupled to a touch sensing module, wherein the touch sensing module is carried by the hem bar assembly during operation of the window covering, and the touch sensing module is configured for:
detecting a hold gesture by sensing a direct or indirect hold of the longitudinal bar;
detecting a release gesture by sensing a release of the longitudinal bar subsequent to sensing the hold of the longitudinal bar; and
transmitting at least one control signal in response to the detected gestures;
a drive unit operably connected to the top end of the window covering and comprising a motor configured to raise or lower the window covering;
a controller in communication with touch sensing module and comprising a memory encoding one or more processor-executable instructions, which when executed by the controller, cause acts to be performed comprising:
receiving the at least one control signal;
controlling the motor to raise or lower the window covering in response to the detected hold of the hem bar assembly; and
controlling the motor to stop raising or lowering the window covering in response to the detected release of the hem bar assembly.

16. A motorized window treatment comprising:
a window covering extending from a top end to a bottom end;
a hem bar assembly connected to the bottom end of the window covering and comprising a longitudinal bar electrically coupled to a touch sensing module, wherein the touch sensing module is carried by the hem bar assembly during operation of the window covering, and the touch sensing module is configured for:
detecting a direct or indirect touch of the longitudinal bar; and
transmitting a control signal in response to the detected touch;
a drive unit operably connected to the top end of the window covering and comprising a motor configured to raise or lower the window covering;
a controller in communication with the touch sensing module and comprising a memory encoding one or more processor-executable instructions, which when executed by the controller, cause acts to be performed comprising:
receiving the control signal;
determining a position of the window covering;
when the window covering is in a fully raised position, controlling the motor to lower the window covering;

when the window covering is in a fully lowered position, controlling the motor to raise the window covering;

when the window covering is in the process of being lowered or raised, controlling the motor to stop lowering or raising the window covering.

17. The motorized window treatment of claim 16, wherein the controller is further configured for:

when receiving a subsequent control signal within a predetermined period of time after stopping raising the window covering, controlling the motor to lower the window covering; and when receiving a subsequent control signal within a predetermined period of time after stopping lowering the window covering, controlling the motor to raise controller controls the motor to open the window covering.

18. A method of controlling a motorized window treatment including (i) a window covering, (ii) a drive unit operably connected to a top end of the window covering and having a motor configured to raise or lower the window covering, iii) a hem bar assembly connected to a bottom end of the window covering and having a longitudinal bar electrically coupled to a touch sensing module, wherein the touch sensing module is carried by the hem bar assembly during operation of the window covering, and the hem bar assembly is configured to sense direct or indirect touch of the longitudinal bar and in response transmit a control signal, and iv) a controller in communication with the touch sensing module configured to receive the control signal and control the motor, the method comprising:

detecting a first gesture by sensing at least one direct or indirect touch of the longitudinal bar;

controlling the motor to raise the window covering in response to the first gesture;

detecting a second gesture by sensing at least one direct or indirect touch of the longitudinal bar; and controlling the motor to lower the window covering in response to the second gesture.

19. The method of claim 18, wherein the first gesture comprises a single touch and the second gesture comprises a double touch, or vice-versa.

20. The method claim 18 further comprising:

detecting a third gesture by sensing at least one direct or indirect touch of the longitudinal bar;

transmitting a plurality of control signals to a plurality of motorized window treatments comprising the third gesture; and substantially simultaneously controlling, by the plurality of motorized window treatments, a plurality of motors in response to receiving the plurality of control signals comprising the third gesture.

21. The method of claim 20, wherein the third gesture comprises a triple touch.

22. A method of controlling a motorized window treatment including (i) a window covering, (ii) a drive unit operably connected to a top end of the window covering and having a motor configured to raise or lower the window covering, iii) a hem bar assembly connected to a bottom end of the window covering and having a longitudinal bar electrically coupled to a touch sensing module, wherein the touch sensing module is carried by the hem bar assembly during operation of the window covering, and the hem bar assembly is configured to sense direct or indirect touch of the longitudinal bar and in response transmit a control signal, and iv) a controller in communication with the touch sensing module configured to receive the control signal and control the motor, the method comprising:

detecting a hold gesture by sensing a hold of the longitudinal bar;

controlling the motor to raise or lower the window covering in response to the detected hold;

detecting a release gesture by sensing a release of the longitudinal bar subsequent to sensing the hold of the longitudinal bar;

controlling the motor to stop raising or lowering the window covering in response to the detected release.

23. A method of controlling a motorized window treatment including (i) a window covering, (ii) a drive unit operably connected to a top end of the window covering and having a motor configured to raise or lower the window covering, (iii) a hem bar assembly connected to a bottom end of the window covering and having a longitudinal bar electrically coupled to a touch sensing module, wherein the touch sensing module is carried by the hem bar assembly during operation of the window covering, and the hem bar assembly is configured to sense direct or indirect touch of the longitudinal bar and in response transmit a control signal, and iv) a controller in communication with the touch sensing module configured to receive the control signal and control the motor, the method comprising:

detecting a direct or indirect touch of the longitudinal bar;

determining a position of the window covering;

when the window covering is in a fully raised position, controlling the motor to lower the window covering;

when the window covering is in a fully lowered position, controlling the motor to raise the window covering;

when the window covering is in the process of being lowered or raised, controlling the motor to stop lowering or raising the window covering.

* * * * *